United States Patent
Niiyama et al.

(10) Patent No.: US 7,505,188 B2
(45) Date of Patent: Mar. 17, 2009

(54) LIGHT CONTROL DEVICE AND METHOD FOR PRODUCING THE SAME

(75) Inventors: Satoshi Niiyama, Yokohama (JP); Hiroshige Ito, Yokohama (JP); Naoko Aoki, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 98 days.

(21) Appl. No.: 11/472,349

(22) Filed: Jun. 22, 2006

(65) Prior Publication Data
US 2006/0291030 A1      Dec. 28, 2006

(51) Int. Cl.
G02B 26/00 (2006.01)
G09G 3/36 (2006.01)

(52) U.S. Cl. .............................. 359/237; 345/87; 345/50

(58) Field of Classification Search .................. 359/237, 359/265–275, 296; 345/1–4, 105, 107, 903, 345/38, 50, 87; 349/73, 187
See application file for complete search history.

(56) References Cited

U.S. PATENT DOCUMENTS

| | | | |
|---|---|---|---|
| 5,162,934 A | 11/1992 | Gunjima et al. | |
| 5,196,952 A | 3/1993 | Hirai et al. | |
| 5,235,445 A | 8/1993 | Hirai et al. | |
| 5,283,675 A | 2/1994 | Ooi et al. | |
| 5,379,137 A | 1/1995 | Hirai et al. | |
| 5,858,268 A | 1/1999 | Niiyama et al. | |
| 5,903,328 A | 5/1999 | Greene et al. | |
| 6,017,466 A | 1/2000 | Fujino et al. | |
| 6,122,021 A | 9/2000 | Hirai et al. | |
| 2002/0080303 A1 | 6/2002 | Izumi | |
| 2004/0233349 A1 | 11/2004 | Shibuya et al. | |

FOREIGN PATENT DOCUMENTS

| | | |
|---|---|---|
| JP | 62-115416 | 5/1987 |
| JP | 2-93683 | 4/1990 |

OTHER PUBLICATIONS

7059/7059F Barium-Borosilicate Glass, PGO Catalog On Line, Product Description, accessed Dec. 4, 2007 at http://www.pgo-online.com/intl/katalog/7059.html (1 page).

*Primary Examiner*—Hung X Dang
*Assistant Examiner*—Tuyen Q Tra
(74) *Attorney, Agent, or Firm*—Oblon, Spivak, McClelland, Maier & Neustadt, P.C.

(57) ABSTRACT

A light control device according to the present invention comprises a plurality of optical elements between two transparent plates in each of which a pair of transparent substrates having taper-shaped side faces with transparent electrodes are located so as to face each other, and a light control layer capable of changing the light transmitting state by electrically controlling the pair of transparent electrodes is disposed between the pair of transparent electrodes, and further, a transparent solid layer is filled in a space formed in the gap between the two transparent plates.

11 Claims, 5 Drawing Sheets

LIGHT CONTROL DEVICE AND METHOD FOR PRODUCING THE SAME

The present invention relates to a light control device and a method for producing the same.

There has been known a light control device with an optical element controlling the light transmitting state by an electrical control. In such light control device, the light transmitting state can be controlled to block or open the eyesight of a user, and therefore, it has been used as architectural materials such as partitions of rooms, exterior windows and so on. Further, there is a proposal for the application to a sunroof or sun visor for an automobile (Non-Patent Document: Materials for Light Control of Polymer/Liquid Crystal, Industrial Materials, p. 18-50, vol. 40, No. 3, 1992 by Nikkan Kogyo Shinbunsha).

As the optical element used for the above-mentioned light control device, an optical element employing an electrochromic element or a liquid crystal optical element employing a liquid crystal/polymer composite with transmittance-scattering operation modes is known (U.S. Pat. No. 5,188,760). The liquid crystal/polymer composite performs the control of light in response to the refractive index difference between the polymer and liquid crystal or the domains of liquid crystal.

As the light control device installing the liquid crystal optical element having a liquid crystal/polymer composite, a light control device comprising two transparent plates disposed at both sides of the optical element is disclosed (JP-A-2-24630).

FIG. 7 is a cross-sectional view showing diagrammatically the structure of the light control device described in JP-A-2-24630. The light control device 300 comprises two transparent plates 301 at front and rear sides so that they serve as a casing. In the gap between the two transparent plates 301, a liquid crystal optical element 303 having a size smaller than the transparent plates is provided. The liquid crystal optical element 303 comprises a pair of transparent substrates 331 each provided with a transparent electrode 433 and a light control layer 435 made of a liquid crystal/polymer composite held between the transparent substrates. The light control device is produced in the same manner as general laminate glass sheets. Namely, the liquid crystal optical element 303 and the two transparent plates 301 are laminated by interposing polyvinyl butyral sheets, and the laminate is defoamed under reduced pressure, followed by applying heat and pressure whereby the laminate is unified.

As another example of the light control device, there is a proposal that a plurality of liquid crystal optical elements are held between two transparent plates (JP-A-62-115416). JP-A-62-115416 describes that the transmittance of visible light can be controlled by connecting electrically the liquid crystal optical elements to solar batteries located at end portions of the two transparent plates by means of transparent conductive films formed on the two transparent plates.

Recently, a wider application to various uses of the light control device is expected. For this, there is the idea of installing a plurality of optical elements in a light control device as disclosed in JP-A-62-115416. In the light control device of this publication, however, there is no disclosure as to how the liquid crystal optical elements are mounted on the two transparent plates.

As described above, JP-A-2-24630 describes that the light control device comprises the two transparent plates 301 and the pair of transparent substrates 331 having a size slightly smaller than the transparent plates 301, located in the gap between the transparent plates 301. Here, in considering that a plurality of liquid crystal optical elements 303 provided with transparent substrates 331 and so on are located in the gap between the two transparent plates 301, the light control device has a complicated structure in which there are different kinds of transparent members. In this case, an additional problem of unity on these transparent members may be created because a high design factor is required for the light control device.

The problem as described above is in the case that the plurality of liquid crystal optical elements 303 are installed in the gap between the two transparent plates 301. However, when a single liquid crystal optical element 303 is to be installed, the common problem of difficulty in increasing the unity among the transparent members may be created.

The present invention has been made in consideration of the above-mentioned background, and is to provide a light control device capable of increasing the unity among transparent members held in the gap between two transparent plates, irrespective of the number of the optical elements installed therein.

In accordance with a first aspect of the present invention, there is provided a light control device comprising at least one optical element disposed between two transparent plates, said optical element comprising a pair of transparent substrates with transparent electrodes located so as to face each other and a light control layer, disposed between the pair of transparent electrodes, capable of changing the light transmitting state by electrically controlling the pair of transparent electrodes, the light control device being characterized in that a transparent solid layer is disposed in a space formed in the gap between the two transparent plates, and the refractive index difference between the transparent solid layer and a transparent substrate is within ±0.10.

The inventors of this application have found that when the side faces of the pair of transparent substrates with transparent electrodes exist in a recognizable region between the two transparent plates, the side faces of the transparent substrates are apt to be recognized. They have made studied intensively to improve this problem. As a result, they have found that the recognition of side faces of the transparent substrates can be improved by selecting materials for the transparent solid layer and the transparent substrates so that the refractive index difference between them is within ±0.10. Here, the recognizable region means the region other than the region that can not be recognized in the presence of another member such as a frame or the like which hold the transparent plates in the two transparent plates.

Further, the flexibility in designing the light control device can be increased remarkably by employing a structure in which an optional number of optical elements are disposed, with the result that a light control device satisfying various needs can be provided. Further, when a plurality of optical elements are employed, the light control region can be divided by the plurality of optical elements. As a result, it is unnecessary to increase the size of optical elements to be mounted on the light control device, and no special manufacturing device is necessary. Further, production yield can be improved in comparison with the case of producing large-sized optical elements.

According to a second aspect of the present invention, there is provided the light control device according to the above-mentioned first aspect, wherein the refractive indices of the pair of transparent substrates are from 1.46 to 1.52. The use of the pair of transparent substrates having the refractive indices of from 1.46 to 1.52 facilitates the selection of the resinous material for the transparent solid layer and increases remarkably the choice of other resinous materials and the flexibility in designing. The transparent solid layer has also the effect of reducing an impact applied to the optical elements. Accordingly, the selection of an appropriate transparent solid layer can increase the structural strength of the light control device.

In accordance with a third aspect of the present invention, there is provided a light control device comprising a plurality of optical elements disposed between two transparent plates, said optical elements each comprising a pair of transparent substrates with transparent electrodes located so as to face each other and a light control layer, disposed between the pair of transparent electrodes, capable of changing the light transmitting state by electrically controlling the transparent electrodes, the light control device being characterized in that a transparent solid layer is disposed in a space formed in the gap between the two transparent plates, and the transparent substrates have taper-shaped side faces.

In the light control device according to the third aspect of the present invention, the flexibility in designing the device can be increased remarkably due to the same reason as the light control device according to the first aspect, and a light control device in response to various needs can be provided. Further, it is unnecessary to form large-sized optical elements to be mounted on the light control device, and no special manufacturing apparatus is necessary. Further, production yield can be improved in comparison with the case of manufacturing the large-sized optical elements.

As general way of use, the light control device is observed by a viewer from a direction of substantially normal line with respect to the major surfaces of the two-transparent plates. Accordingly, it is ideal that when the device is observed from this range of view, reflected light does not reach the viewer. FIG. 1(a) is a diagram for explaining the state of the reflected light with respect to incident light in a case that the side faces of the transparent substrates are orthogonal. The incident light entering into the light control device 100 with a slight inclination with respect to the direction of normal line of the major surface of a first transparent plate 101 in the light control device 100 passes through a transparent solid layer 108 to reach a transparent substrate 131 where the incident light is reflected. Then, this reflected light passes through the transparent solid layer 108 and a second transparent plate 102 successively so that the reflected light is recognized by the viewer.

In this case, the viewer recognizes the side face as the end portion of the transparent substrate. According to Fresnel's formula, there is known that when the incident angle (assuming that the direction of normal line with respect to the incidence plane is 0°) approaches 90°, the reflectivity of the light is very high at the border region of media having different refractive indices. Also, there is known that when light is incident from a medium having a larger refractive index to a medium having a smaller refractive index and when the incident angle exceeds the critical angle, the total reflection of light is caused. Accordingly, when the side face of the transparent substrate is orthogonal as shown in FIG. 1(a), the incident light entering with a slight inclination with respect to the direction of normal line on the major surface of the first transparent plate 101 is recognized with high efficiency by the viewer as the reflected light.

Further, when a material constituting the first transparent plate 101 or the second transparent plate 102 has a refractive index different from a material for the transparent solid layer 108, refracted light generates at each border plane according to Snell's law. In FIG. 1, refracted light is neglected for convenience of explanation.

FIG. 1(b) is a diagram for explaining the state of reflected with respect to incident light in a case that a taper is provided at the side face of the first transparent substrate 131. When the incident light enters with a small incident angle into the side face of the first transparent substrate 131, the reflectivity can be reduced according to Fresnel's formula. When the incident angle is large, the reflectivity takes place with high efficiency. However, in the general way of use by viewers, namely, when the device is observed from the direction of substantially normal line with respect to the major surfaces of the two transparent plates, it is possible to deflect the reflected light to an unrecognizable direction. Therefore, when the side face of each of the transparent substrates has a tapered shape, the quantity of reflected light observed by the viewer can remarkably be reduced. As a result, the visibility of the side faces of the transparent substrates can be improved in comparison with the case that the side faces are orthogonal with respect to the major surfaces.

According to a fourth aspect of the present invention, there is provided the light control device according to the third aspect, wherein when the refractive index of any of the transparent plates is represented by $n_a$, the refractive index of the transparent solid layer is represented by $n_b$, the refractive index of any of the transparent substrates is represented by $n_c$ and the taper angle of the side face of any of the transparent substrates is represented by θ (degree), there is a relation of $n_a > n_b$, and when $n_b > n_c$, the following Formula 1 is satisfied, and when $n_b < n_c$, the following Formula 2 is satisfied:

$$\theta < 180 - \sin^{-1}(1/n_b) - \sin^{-1}(n_c/n_b) \quad (1)$$

$$\theta < \sin^{-1}(n_b/n_c) - \sin^{-1}(1/n_c) \quad (2)$$

When the above-mentioned formulae (1) and (2) are satisfied, the visibility of the side faces of the transparent substrates can be improved more effectively.

According to a fifth aspect of the present invention, there is provided a light control device comprising at least one optical element disposed between two transparent plates, said optical element comprising a pair of transparent substrates with transparent electrodes located so as to face each other and a light control layer, disposed between the pair of transparent electrodes, capable of changing the light transmitting state by electrically controlling the pair of transparent electrodes, the light control device being characterized in that the optical element is located so as to face the two transparent plates with certain distances, transparent spacing members are formed between the optical element and the two transparent plates, a transparent solid layer is disposed in a space formed in the gap between the two transparent plates, and the refractive index difference between the transparent solid layer and any of the transparent substrates is within ±0.10.

In the light control device of the fifth aspect of the present invention, the flexibility in designing the light control device can remarkably be increased by the same reason as in the light control device of the first aspect, and therefore, light control devices can be provided in response to various needs. Further, it is unnecessary to increase the size of optical elements to be installed in a light control device, and therefore, a special manufacturing device does not required. Further, production yield can be improved in comparison with the case of producing large-sized optical elements. In addition, since the transparent spacing members and the transparent solid layer in which the refractive index difference between them is within ±0.10 are used, the visibility of the transparent spacing members can be improved.

According to a sixth aspect of the present invention, there is provided the light control device according to the fifth aspect, wherein the transparent spacing members and the transparent solid layer are made of the same material. With this, the refractive index difference between the transparent spacing members and the transparent solid layer can be made equal to thereby improve the visibility.

According to a seventh aspect of the present invention, there is provided the light control device according to any one of the aspects 1 to 6, wherein the pair of transparent substrates with transparent electrodes are made of borosilicate type glass.

According to an eighth aspect of the present invention, there is provided a method for producing a light control device having an optical element between two transparent plates, which comprises preparing an optical element in which a pair of transparent substrates with transparent electrodes are located so as to face each other and a light control layer capable of changing the light transmitting state by electrically controlling the pair of transparent electrodes is disposed between the pair of transparent electrodes, fixing the optical element to at least one of the two transparent plates and disposing a transparent solid layer in a space formed in the gap between the two transparent plates wherein the refractive index difference between the transparent solid layer and any of the transparent substrates is within ±0.10.

In the method for producing the light control device according to the eighth aspect, materials for the transparent solid layer and the transparent substrates are selected so that the refractive index difference between them is within ±0.10 whereby the light control device capable of improving the visibility of the side faces of the transparent substrates can be manufactured. Further, since the transparent solid layer is disposed in a space in the gap formed between the two transparent plates, it is possible to produce the light control device capable of protecting effectively the optical element even if an external force is applied to the device.

According to a ninth aspect of the present invention, there is provided a method for producing a light control device having an optical element between two transparent plates, which comprises disposing a pair of transparent substrate having taper-shaped side faces at front and rear sides of an optical element, forming a transparent electrode on each of the pair of the transparent substrates, preparing the optical element so that a light control layer capable of changing the light transmitting state by electrically controlling the pair of transparent electrodes is disposed between the pair of transparent electrodes, fixing the optical element to at least one of the two transparent plates and disposing a transparent solid layer in a space formed in the gap between the two transparent plates.

In the method for producing the light control device according to the ninth aspect, the transparent substrates have taper-shaped side faces, and therefore, it is possible to produce the light control device which can improve the problem of the recognition of the side faces of the transparent substrates. Further, since the transparent solid layer is disposed in a space in the gap formed between the two transparent plates, it is possible to produce the light control device capable of reducing an impact which may be applied from the exterior, so that the optical element can be protected effectively.

DRAWINGS

FIG. 1(a) is a diagram showing the relation of incident light and reflected light in a case that the side face of each substrate constituting the optical element is orthogonal with respect to the major surface of the substrate, and FIG. 1(b) is a diagram showing the relation of incident light and reflected light in a case that the side face of each substrate constituting the optical element has a tapered shape;

In the following, explanation will be made as to an embodiment 1 according to the present invention. It is clear that modifications of the explained embodiment are also included in the present invention as long as they meet the spirit of the present invention. Further, the size of each member shown in the figures for explaining the present invention is for convenience of explanation, and the proportions in size of the members are different from those of actual ones. Further, the technique disclosed in an earlier Patent Application No. 2005-15005 made by the inventors of this application is applicable appropriately to the present invention.

Figure 2A:
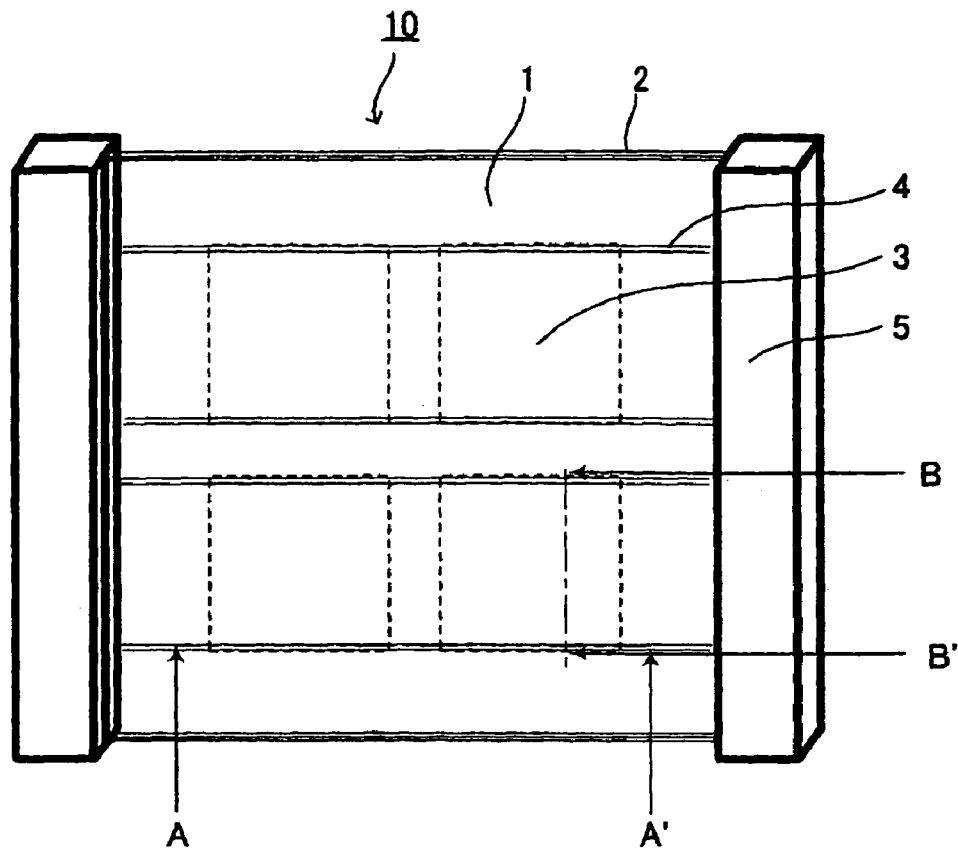
FIG. 2 is a diagrammatical perspective view showing the construction of the light control device according to an embodiment of the present invention.
Figure 2B:
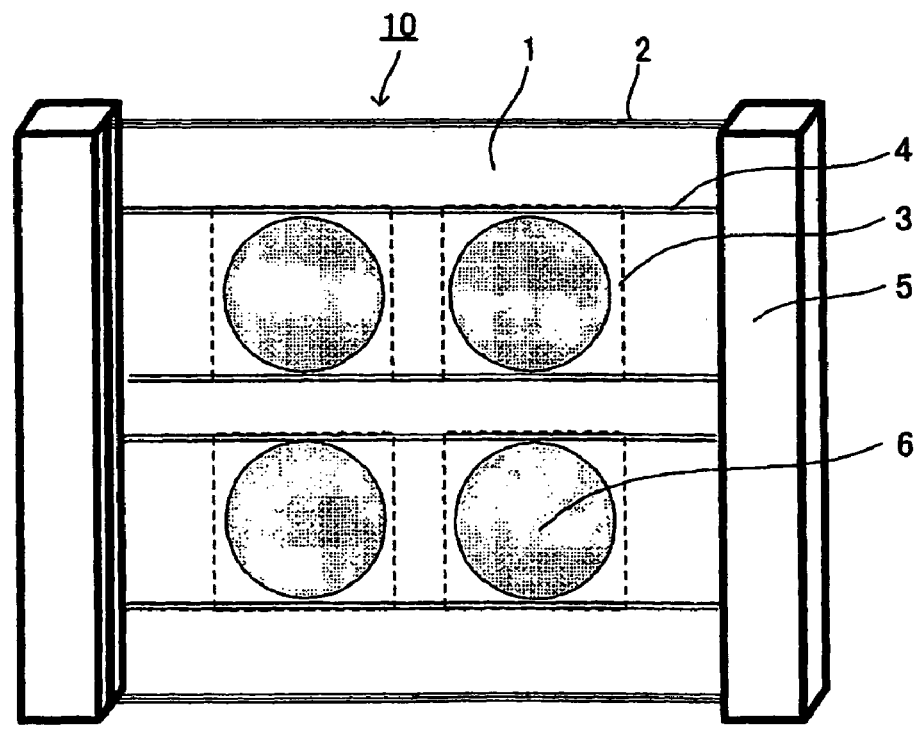

FIGS. 2(a) and 2(b) are perspective views showing diagrammatically the structure of the light control device of the present invention. The light control device 10 of the present invention comprises a first transparent plate 1 and a second transparent plate 2 as paired transparent plates, a liquid crystal optical element 3 as an optical element, a connection wire 4, a frame 5 and so on.

The first transparent plate 1 and the second transparent plate 2 (hereinafter, they may be referred to as "the first transparent plate 1 or the like" all together) are made of rectangular planar members having substantially the same size and are located so as to face each other. They are located at a front face and a rear face of the light control device 10 so that they can protect the interior of the light control device 10, and they function as a casing. However, the first transparent plate 1 and the second transparent plate 2 are not always restricted to the planar members but they may be curved planar members independently. Further, as the shape of the first transparent plate 1 or the like, it may be an optional shape such as a circular shape or the like depending on uses or needs.

The first transparent plate 1 or the like functioning as a protection plate for the liquid crystal optical element 3 is preferably be an inflexible transparent plate. As the first transparent plate 1 or the like, glass or a transparent resin such as polycarbonate can be used. An appropriate material is selected depending on location of installation or usage of the light control device 10. For weight saving, it is preferred to use resin. When the device is located in a public area, it is preferable to use a glass plate having resistance to scratch marks and excellent strength. A tempered glass usable for vehicles or a common tempered glass produced by an air-cooled tempering method or a chemical tempering method may be used. Further, a laminate glass comprising two glass sheets and a resin layer interposed therebetween may be used.

Further, a film with AR coating (anti-reflection coating) may be bonded to the outer surface of the first transparent plate 1 or the like if necessary.

The liquid crystal optical element 3 is located in the gap between the first transparent plate 1 and the second transparent plate 2. In this embodiment, four rectangular liquid crystal optical elements 3 having substantially the same size are arranged in two columns and two rows. Each of the liquid crystal optical elements 3 is disposed in substantially the same plane so as not to overlap with each other so that each element can be recognized through the first transparent plate 1 or the second transparent plate 2. The detailed structure of the liquid crystal optical elements 3 will be described later.

In each of the liquid crystal optical elements 3, a single or a plurality of light control regions 6 are formed. This light control region 6 can control a light transmitting state and a light scattering state by an electrical control, so that a user can recognize the light transmitting state and the light scattering state through the first transparent plate 1 or the second transparent plate 2.

FIG. 2(a) is a diagrammatical perspective view of the light control device 10 when no voltage is applied to the liquid crystal optical element 3. The light control regions 6 indicate the light transmitting state, so that the light control device unified with the first transparent plate 1 or the like can be seen as if there is a single transparent glass plate.

FIG. 2(b) is a diagrammatical perspective view of the light control device 10 when a voltage is applied to the liquid crystal optical elements 3. The light control regions 6 indicate the light scattering state so that the light control regions 6 can be recognized through the first transparent plate 1 or the second transparent plate 2. In the embodiment shown in FIG. 2(b), the shape of the light control region 6 of each of the liquid crystal optical element 3 is made circular. In this embodiment, explanation has been made on the case of a reverse mode wherein the light transmitting state is provided when no voltage is applied to the optical elements and the light scattering state is provided when a voltage is applied thereto. However, the structure may be modified so as to be a normal mode depending on usage. Further, it is not always be two values: transmitting and scattering but the transmittance may be changed. For example, a structure of changeable range of from 100% of transmittance to 10% of transmittance may be employed.

Frames 5 hold both left and right end portions of the first transparent plate 1 and the second transparent plate 2 which are located so as to face each other in FIG. 2 whereby the frames 5 have the role for supporting the first and second transparent plates 1, 2. Each part of the frames is fixed to the installation plane by means of a fitting member (not shown) so that a user can recognize the light control regions 6a of the liquid crystal optical elements 3 from both sides of the first and second transparent plates 1, 2 or either side of them depending on usage. With such arrangement, the light control device 10 can easily and stably be located. In this embodiment, the frames 5 hold the both left and right end portions of the first transparent plate 1 and the second transparent plate 2 which are located so as to face each other. However, instead of this structure, frames 5 may be provided in the entire outer peripheries of the first transparent plate 1 and the second transparent plate 2, or a frame 5 may be provided only one side.

With respect to the connection wire 4, 8 connection wires are extended substantially linearly and parallel to each other from an end to the other end of the first transparent plate 1, or the like held by the frames. By extending the connection wires 4 in a substantially linear form, the designing factor can be improved and the manufacturing process can be simplified. Further, the parallel arrangement can increase the designing factor effectively. In addition, by arranging the connection wires in substantially parallel with respect to a side of the first transparent plate 1 or the like, the designing factor can effectively be increased. The connection wires 4 are arranged at positions apart from the first transparent plate 1 and the second transparent plate 2 so as to traverse the inside of two liquid crystal optical elements 3 in the recognizable region and the transparent solid layer which will be described later. Here, the recognizable region means the region, in the first and second transparent plates 1, 2, other than the region where the first and second transparent plates 1, 2 are held by the frames 5 or another member.

The connection wires 4 are electrically connected to transparent electrodes (described later) in the inside of each liquid crystal optical element 3. On the first transparent plate 1 and the second transparent plate 2 held by the frames 5, terminals (not shown) for connecting the connection wires 4 to an exterior driving circuit (not shown) are provided. The connection wires 4 are connected to the exterior driving circuit received in a frame 5 through this terminals. A voltage is applied to a liquid crystal element 3 through a connection wire 4 in response to a signal from the exterior driving circuit. The arrangement of the connection wires 4 to the liquid crystal optical elements 3 will be described later.

For the connection wires 4, it is preferable to use a conductive material of metal in a form of foil or line by which a predetermined rigidity can be obtained. For example, copper wire, iron wire, aluminum wire, stainless steel wire, etc. may be mentioned. The thickness of the wire and material for the wire can appropriately be selected depending, on the purpose of use, the size of the light control device and so on.

The first transparent plate 1 or the like shown in FIG. 2 may have a size of, for example, 510 mm wide×470 mm long, and the liquid crystal optical element 3 may have a size of, for example, 220 mm wide×220 mm long. The thickness of the light control device 10 may be, for example, about 10 mm. As the number of liquid crystal optical elements arranged inside the light control device 10, an optional number can be determined: such as 4 in 2 columns and 2 rows, 6 in 3 columns and 2 rows, 9 in 3 columns and 3 rows, 12 in 4 columns and 3 rows, 16 in 4 columns and 4 rows, for example. Further, a random arrangement without a regular arrangement of column and row may be employed.

The light control device 10 of this embodiment employs the construction that the connection wires are provided in the gap between the two transparent plates at positions apart from them respectively so as to extend from the optical elements to the both end portions of the two transparent plates and an optional number of optical elements are arranged. Accordingly, flexibility in designing the light control device can remarkably be increased. As a result, various types of light control devices can be provided in response to various needs. Further, since the plurality of optical elements are disposed, it is possible that a the light control region can be shared with the plurality of optical elements. As a result, it is unnecessary to manufacture large-sized optical elements to be mounted in the light control device, and use of a special manufacturing apparatus is not necessary. Further, production yield can be improved in comparison with the case of producing large-sized optical elements.

The light control device 10 shown in FIG. 2 is merely of an example, and therefore, the present invention should not limited thereto. For example, the liquid crystal optical elements 3 may be located at at least a part of the region of the gap between the first transparent plate 1 and the second transparent plate 2. Further, the shape of the light control region 6 for each liquid crystal optical element 3 may be changed for each liquid crystal optical element 3. The light control region 6 for each liquid crystal optical element 3 is not always necessary to be single as shown in FIG. 2(b) but may be divided into plural. The light control region 6 may have any shape: a graphic figure such as a circular shape, or various patterns comprising symbols or letters such as a company logo. Explanation has been made as to the case that four liquid crystal optical elements 3 are employed. However, the present invention is not limited to this embodiment but a single or a plurality of liquid crystal optical elements may be used.

Figure 3:
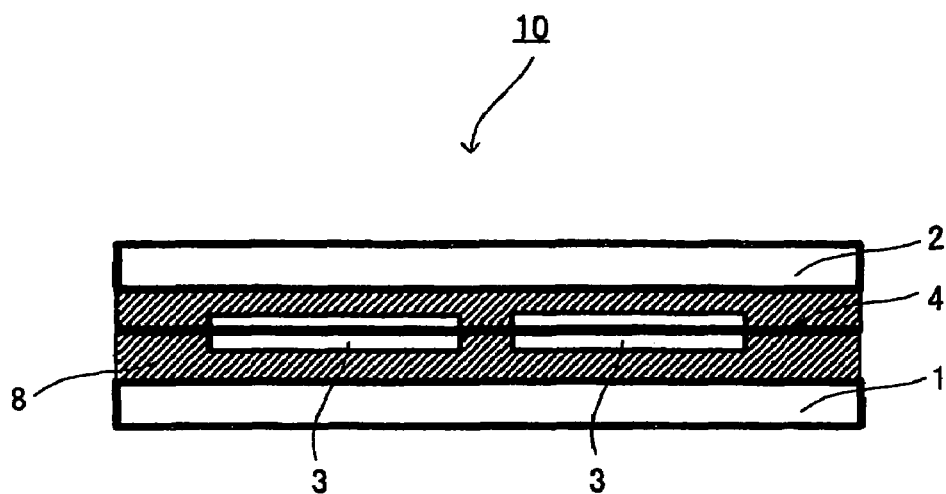
FIG. 3 is a cross-sectional view taken along a line A-A' in FIG. 2.

FIG. 3 is a cross-sectional view taken along a line A-A' in FIG. 2(a). As shown in the figure, the first transparent plate 1 and the second transparent plate 2 are located so as to face each other and the liquid crystal optical elements 3 are disposed between these transparent plates with gaps respectively, and the transparent solid layer 8 is filled in a space formed in the gap between the first transparent plate 1 and the second transparent plate 2 so that the transparent solid layer 8 can reduce an impact applicable from the exterior. Namely, the transparent solid layer 8 is filled in the gaps where the first transparent plate 1 and the second transparent plate 2 are opposed to the liquid crystal optical elements 3 and the gap where the first transparent plate and the second transparent plate 2 are opposed directly without interposing the liquid crystal elements 3.

The thickness of the filled transparent solid layer 8 can be determined to have an appropriate value in consideration of the structural strength depending on usage, the reduction of a stress to the liquid crystal optical elements 3 and so on. For example, the distance between the first transparent plate 1 and a liquid crystal optical element is determined to be 1 mm and the transparent solid layer 8 can be filled in this gap. Further, it is preferred that the transparent solid layer 8 has an adhesive capacity so that the liquid crystal optical elements 3 can be adhered to the first transparent plate 1 and the second transparent plate 2 respectively. Here, "adhesion" includes not only the case that they are fixed together in a substantially inseparable manner but also the case that they are adhered together in a separable manner by the application of an external force exceeding a predetermined value.

The transparent solid layer 8 preferably has a high light transmittance in a visible range. Further, the refractive index of the transparent solid layer 8 is preferably close to the refractive indices of the liquid crystal optical elements 3, the first transparent plate 1 and the second transparent plate 2 at their contact surfaces so that the first transparent plate 1, the second transparent plate 2 and the liquid crystal optical elements 3 in a unified body can be seen as if they are of a single glass sheet.

The transparent solid layer 8 is preferably such that a liquefied resin material is injected into a space formed in the gap between the first transparent plate 1 and the second transparent plate 2, the liquefied resin material being curable after the injection. Such material can form effectively the transparent solid layer which can control effectively the stress to the liquid crystal optical elements 3. In particular, such material is useful in the case that the connection wires and the optical elements are arranged complicatedly. Further, the material having a low shrinkage in curing should be selected. The liquefied resin material particularly preferably contains at least polymerizable compound and polymerization initiator. For the curing, heat or light is preferably used. The transparent solid layer 8 may be in a gelled state.

As the resin for forming the transparent solid layer 8 as the major component, silicone, (meth)acryl, urethane or the like may be mentioned. The (meth)acryl resin is one of preferred transparent resin because of simplifying the manufacture process. For example, a resin having a Tg of −10° C., a peak tan δ value of 1.2 and a visible transmittance of 92% may be used.

When a polymerizable monomer is used for the liquefied resin composition for forming the transparent solid layer 8, a polymerization initiator is added. The polymerization initiator may be selected appropriately from known ones. Further, an oligomer component may be included in the transparent solid layer 8 as long as it is not against the spirit of the present invention. Thus, it is possible to control the shrinkage of the transparent solid layer 8 during polymerization, and it is possible to disperse and absorb stresses effectively.

When the transparent solid layer 8 is cured with heat, the curing temperature is preferably within a temperature range of the light control device 10 in use, whereby the occurrence of the residual stress due to the difference of the thermal expansion coefficients among different members can be reduced, and stresses applied to the liquid crystal optical element 3 can be reduced. This residual stress becomes serious as the size of the light control device 10 is increased. However, this problem can be avoided effectively by using the curing temperature within the temperature range in which the light control device 10 is usable.

In the gaps among the liquid crystal optical elements 3, the first transparent plate 1 and the second transparent 2, an optical member other than the transparent solid layer 8 may be disposed. However, such optical member should be disposed without any air layer. In this case, the reflection of light due to a different refractive index can be controlled. As the optical member other than the transparent solid layer 8, planar-sheet like UV cutting films may be bonded to the inner surfaces of the first transparent plate 1 and the second transparent plate 2.

The transparent solid layer 8 of this embodiment is formed over substantially the entire surfaces of the first and second transparent plates. Accordingly, an external force applied to the entire light control region via the first transparent plate 1 or the like can effectively be controlled. Further, since a single same material is formed over the entire surface of the first transparent plate 1 or the like, there is no danger of losing the unity of the transparent region in the light control device 10. In addition, since the connection wires 4 are secured with the transparent solid layer 8, the strength of the structure can be assured effectively.

Figure 4:
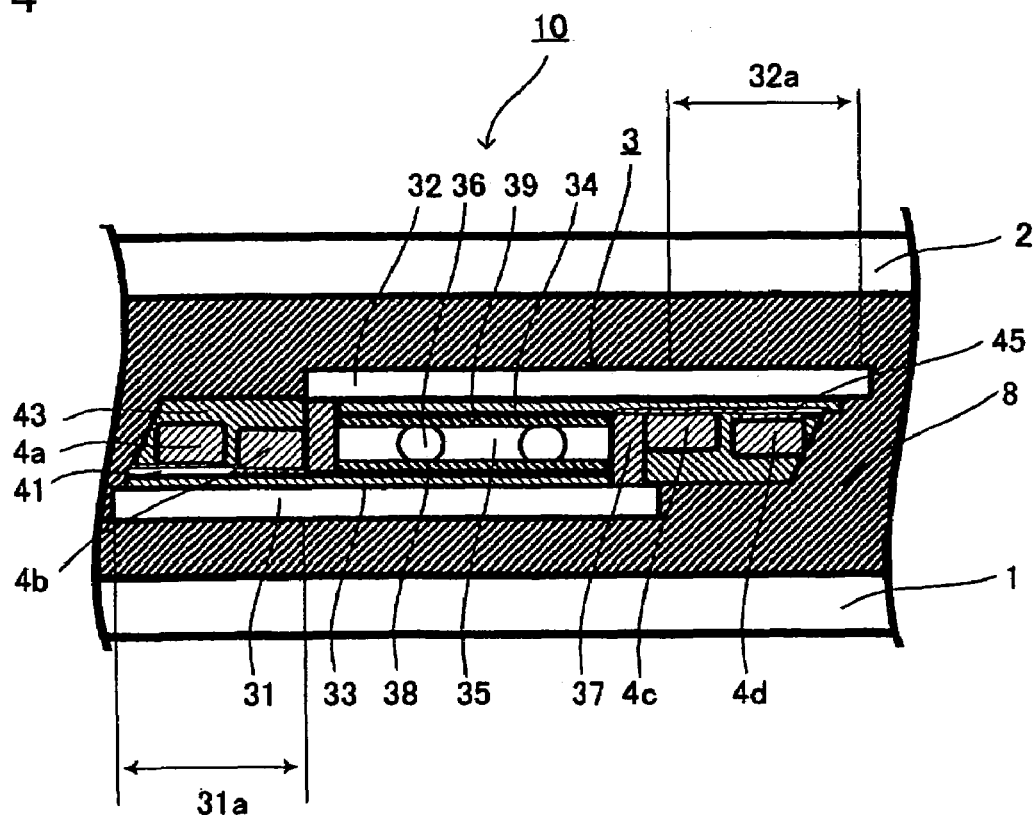
FIG. 4 is a cross-sectional view showing the liquid crystal optical element according to an embodiment of the present invention.

The structure of the liquid crystal optical element 3 will be described. FIG. 4 is a diagrammatical cross-sectional view showing an example of the structure of the liquid crystal optical element 3 according to the present invention, the cross-sectional view being taken along a line B-B' in FIG. 2. As shown in the figure, the liquid crystal optical element 3 of this embodiment comprises a first transparent substrate 31, a second transparent substrate 32, a first transparent electrode 33, a second transparent electrode 34, a light control layer 35, spacers 36, a peripheral seal 37, a first alignment film 38, a second alignment film 39 and so on. In the above, description has been made as to the transparent solid layer 8 made of a liquefied resin material as an example. However, the material is not restricted thereto and any known material may be used as long as it does not against the spirit of the present invention. For example, a sheet-like material having adhesiveness may be used.

The first transparent substrate 31 and the second transparent substrate 32 are respectively rectangular members having substantially the same size and are located so as to face each other with a predetermined gap. The first transparent substrate 31 or the like may have its side face which is orthogonal or has a curved shape with respect to the major surface. Further, the first transparent substrate 31 and the second transparent substrate 32 are located in an opposing state but they are displaced mutually in a parallel direction so that they have non-facing regions in the vicinity of their respective one side. Namely, the first transparent substrate 31 has a first non-facing region 31a in the vicinity of its one side, which does not face the second transparent substrate 32, and the second transparent substrate 32 has a second non-facing region 32a in the vicinity of its one side, which does not face the first transparent substrate 31. To the first non-facing region 31a and the second non-facing region 32a, the before-mentioned connection wires 4 are connected. With this structure, the flexibility on design in the direction of the thickness of the connection wires 4 can be increased. In particular, this structure is useful in the case that the distance between the first transparent substrate 31 and the second transparent substrate 32 is small, between which the light control layer 35 of liquid crystal/polymer composite is disposed. Further, manufacturing process for arranging the connection wire in the liquid crystal optical elements can be simplified.

The widths of the first non-facing region 31a and the second non-facing region 32a are determined appropriately depending on the number of the connection wires 4 to be extended. For example, when two connection wires 4 are extended, the widths may be determined to be about 7 mm. For the first transparent substrate 31 or the second transparent substrate 32, a transparent glass substrate, a film substrate such as a polyester film or the like, or a substrate in combination therewith may be used. Up to now, use of the first transparent substrate 31 and the second transparent substrate 32 having rectangular shapes has been described as an example. However, the shape is not limited thereto, and the transparent substrates of circular shape may be used.

In the first transparent substrate 31 and the second transparent substrate 32, patterns of the first transparent electrode 33 and the second transparent electrode 34 are formed on their major surfaces in the portions where the transparent substrates 31, 32 face each other.

In this embodiment, each pattern is formed to provide a circular shape as shown in FIG. 2. In response to this pattern, a desired picture image can be displayed. For the first transparent electrode 33 and the second transparent electrode 34, films of metal oxide such as ITO (indium oxide-tin oxide), tin oxide or the like may be used. For example, a glass sheet with a transparent conductive film wherein on a glass substrate for the first transparent substrate 31 or the second transparent substrate 32, a film of metal oxide such as ITO (indium oxide-tin oxide) or tin oxide is provided to form the first transparent electrode 33 or the second transparent electrode 34, a polyester film with a transparent conductive film wherein an ITO film is provided on polyethylene terephthalate (PET) or PES with a transparent conductive film may be used.

On the first transparent electrode 33 and the second transparent electrode 34, the first alignment film 38 and the second alignment film 39 are respectively formed, which are in contact with the light control layer 35 to align the liquid crystal in the light control layer 35. The first alignment film 38 and the second alignment film 39 serve to align the liquid crystal in the direction perpendicular to the substrate planes. The alignment films may not always be necessary as far as the liquid crystal can be controlled to align vertically with respect to the substrate planes. For example, the first transparent electrode 33 and the second transparent electrode 34 whose surfaces are polished directly may be used, or these transparent electrodes are provided with function to align the liquid crystal with respect to these surfaces may be used.

Between the first transparent substrate 31 and the second transparent substrate 32, the light control layer 35 as an electrooptical layer and spacers 36 are sandwiched as shown in FIG. 4. The spacers 36 serve to define the thickness of the liquid crystal cell. Namely, the thickness of the light control layer 35 sandwiched between the substrates is defined by means of the spacers 36. For the material of the spacers 36, glass particles, resin particles, alumina particles, glass fibers or a film may be employed, for instance. The spacers may be spherical spacers, fiber-type spacers, column-type spacers or spacers formed by a photolithographic technique.

The thickness of the light control layer 35, when the layer is a liquid crystal/polymer composite layer as in this embodiment, is generally from 1 to 50 μm, more preferably, from 5 to 30 μm. If the distance is too small, the contrast decreases, and on the contrary, if the distance is too large, the driving voltage increases. The polymer contained in the light control layer 35 comprises a group of plural column-like resin. The content of the polymer in the light control layer is preferably at least 7 wt %.

In the liquid crystal as an constituent element of the light control layer 35, the alignment direction of the liquid crystal in a light transmitting state should coincide substantially with the direction of normal line with respect to the substrate plane. By aligning the liquid crystal vertically, the light transmitting state of the liquid crystal optical element can be kept better. In this embodiment, a reverse mode is employed. Accordingly, when no voltage is applied to the first transparent electrode 33 and the second electrode, the liquid crystal is aligned to exhibit a light transmitting state.

On the other hand, when a voltage is applied across the first transparent electrode 33 and the second transparent electrode 34, the direction of the liquid crystal become random due to an electric field between the electrodes to thereby show a light scattering state. Thus, since the light scattering state and the light transmitting state can be controlled by applying a voltage or applying no voltage, a desired picture image can be displayed in response to the patterns of the first transparent electrode 33 and the second transparent electrode 34.

The usable liquid crystal may be a nematic liquid crystal, a cholesteric liquid crystal, a smectic liquid crystal and a ferroelectric liquid crystal. Particularly, the nematic liquid crystal is preferably used because it has a wider liquid crystal temperature range and a lower viscosity than the other kind of liquid crystal, whereby the operable temperature range of a liquid crystal device can be large and the response speed can be fast. When the dielectric anisotropy of the liquid crystal is negative, the alignment of the liquid crystal should be vertical.

As liquid crystal compounds, various kinds of compounds usable as commonly used materials for display or materials for an electric field driving type display element can be used. Specifically, biphenyl type, phenyl benzoate type, cyclohexylbenzene type, azoxybenzene type, azobenzene type, azomethine type, terphenyl type, biphenyl benzoate type, cyclohexylbiphenyl type, phenylpyridine type, cyclohexylpyrimidine type, cholesterol type or the like, may be mentioned.

These liquid crystal compounds are not necessarily used solely but may be used in combination of at least two kinds of liquid crystal compounds, in the same manner as commonly used. In order to effect the display by forming an electric field, a liquid crystal compound having a negative dielectric anisotropy among these liquid crystal compounds is preferably used. Further, for the purpose of reducing the driving voltage, such one having a large dielectric anisotropy in absolute value is preferably used. As the liquid crystal compound having a large dielectric anisotropy in absolute value, a compound having a halogen atom such as a cyano group, fluorine, chlorine or the like as substituent group is usable because of its having chemical stability. When the reduction of the driving voltage is considered to be important, a compound having a cyano group as substituent group is used. When reliability is considered to be important, a compound having a fluorine atom as substituent group is used.

The light control layer 35 may contain various chemical compounds in order to improve the contrast ratio or stability. For example, in order to improve the contrast, various dichroic pigments such as anthraquinone type, styryl type, azomethine type, azo type and the like may be used. In this case, the dichroic pigments are preferred to be fundamentally compatible to a liquid crystal compound and to be incompatible to a polymer compound. Further, antioxidant, ultraviolet absorber or various kinds of plasticizer may be preferably used to increase stability and durability.

In the liquid crystal optical element 3 of this embodiment, the light control layer 35 is the major constituent element to perform the optical effect as described above. The light control layer 35 is produced from a compound liquid of the precursor of the light control layer (hereinbelow, referred to simply as "compound liquid"). It is important to form the light control layer 35 having good optical function via a phase separation process from the compound liquid. If the phase separation in insufficient, the driving voltage to operate the liquid crystal may increase, or the liquid crystal optical element 3 becomes inoperable. Here, the phase separation structure means the inner structure of the liquid crystal cell which is formed via the phase separation process and which can achieve electrooptical characteristics and performance.

The phase separation structure in microscopic view of the liquid crystal/polymer composite can be changed in various manners depending on the kind, nature, mixing ratio and so on of compounds constituting the compound liquid of the precursor of the light control layer 35. The combination and the mixing ratio of the materials used are determined in consideration of optical characteristics such as transmitting/scattering characteristics, the magnitude of the driving voltage and reliability required as an electrooptical element. The compound liquid of the precursor of the light control layer 35 is not in particular limited as long as the above-mentioned light control layer 35 can be obtained. However, a mixture of a liquid crystal compound or liquid crystal compounds and a polymer compound or polymer compounds is usable. In order to obtain the light control layer 35 having a high quality and uniform electrooptical characteristics of transmitting/scattering, it is preferred to select appropriately kinds of compounds and the mixing ratio of them to obtain a liquid crystal layer containing uniformly the compound liquid of the precursor.

Materials are selected so that refractive index differences among the first transparent substrate 31, the second transparent substrate 32 and the transparent solid layer 8 are within ±0.10. Thus, the problem that the side faces of the transparent substrates are recognized by a viewer when he observes the light control device from the direction of substantially normal line with respect to the major plane of the device, can be improved. As a result, it is possible to form the light control device in which the unity of the transparent solid layer 8 sandwiched between the first transparent plate 1 and the second transparent plate 2, the first transparent substrate 31 and the second transparent substrate 32 is increased. Further, by employing materials in which refractive index differences among the first transparent substrate 31, the second transparent substrate 32 and the transparent solid layer 8 are small, it is possible to reduce refracting light at border planes of the transparent solid layer 8 to the first transparent substrate 31 and the second transparent substrate 32.

In order to reduce effectively the reflectivity, it is preferable that the refractive index of the transparent solid layer 8 is smaller than the refractive index of the first transparent substrate 31 or the second transparent substrate 32. Most preferably, the refractive index of the transparent solid layer 8 should be the same as the refractive index of the first transparent substrate 31 or the second transparent substrate 32.

For the materials of the first transparent substrate 31 and the second transparent substrate 32, such ones having a refractive index in a range of from 1.46 to 1.52 are preferably selected because it becomes easier to select a resin material for the transparent solid layer 8 whose effective index is to be controlled. In addition, flexibility in designing various processes such as preparation, injection and curing of the resin material to be used, can be increased remarkably. Further, the physical properties of the transparent solid layer 8 after curing can easily be adjusted simultaneously.

In the present invention, as the transparent material used for the first transparent substrate 31 and the second transparent substrate 32, a glass sheet is preferably used because a large-sized substrate having rigidity is available at a lower price. As glass sheets produced in large scale, there are soda lime type glass having a refractive index of from 1.51 to 1.53 and borosilicate type glass having a refractive index of around 1.47 to 1.49.

In selecting a glass sheet from glass sheets produced and sold in industrial scale, a glass sheet having a wider range of refractive index value should be selected among the group of products having various ranges of refractive index values as described above. However, when a special formulation can be prepared, a desired refractive index is obtainable. Besides the above-mentioned glass materials, there have been known AS glass as soda lime glass available for the substrate of LCD, AN glass as non-alkali glass (each manufactured by Asahi Glass Company, Limited), and they can be used as long as they can meet with the requirement of the resin material.

In the preferred embodiment of the present invention, it is preferable to select borosilicate type glass which has a refractive index close to the refractive index (1.486) of the transparent solid layer as the solidified material of the liquefied resin used. Fine adjustment of the refractive index value relative to borosilicate type glass can easily be made by changing the resin material to adjust the structure of the cured resin.

The refractive index of the resin can be about 1.46 at its lower limit by adjusting the formulation of the compound to be used. On the contrary, the refractive index of the transparent solid layer can be increased. For example, when acryl resin is used, the refractive index can be selected from the range of from 1.46 to 1.49.

Thus, based on the refractive index of previously selected glass sheet, the refractive indices of the glass and the resin are made substantially coincident with each other by adjusting the optical performance of the resin sandwiched between the transparent substrates. This method is preferable because the refractive indices of the both members can precisely be matched. On the other hand, it is possible to employ a technique that the refractive index of the resin material is first selected, and then, the optical refractive index of the glass sheet is selected from the group of usable glass sheets.

Then, the structure of the connection wires will be described in detail. In FIG. 4, in each liquid crystal optical element 3, four connection wires are fixed by means of ACF 45. Among these four connection wires, two connection wires are arranged in the first non-facing region 31a on the first transparent substrate 31 and the other two connection wires are arranged in the second non-facing region 32a on the second transparent substrate 32. For convenience of explanation, the connection wire arranged at an end side of the first transparent substrate 31 is referred to as a first connection wire 4a, the connection wire adjacent thereto is referred to as a second connection wire 4b, the connection wire arranged at an inner side of the second transparent substrate 32 is referred to as a third connection wire 4c and the connection wire adjacent thereto is referred to as a fourth connection wire 4d. These connection wires are preferably fixed at the first non-facing region 31a on the first transparent substrate 31 and the second non-facing region 32a on the second transparent substrate 32 along their longitudinal directions respectively. With this arrangement, fixing portions for the connection wires 4 to the liquid crystal optical element 3 can be increased, and the strength of the structure can be increased.

In the two connection wires 4 located in the first non-facing region 31a on the first transparent substrate 31, the first connection wire 4a located at the position remoter from the light control layer 35 is fixed onto an insulation layer 41 formed on the first transparent electrode 33, via the ACF 45. Accordingly, the first connection wire 4a is not electrically connected to the first transparent electrode 33. On the other hand, the second connection wire 4b located at the position close to the light control layer 35 is directly in contact with the first transparent electrode 33 by means of the ACF 45, without interposing the insulation layer 41. Accordingly, the second connection wire 4b is electrically connected to the first transparent electrode 33 as shown in FIG. 4.

The first connection wire 4a is electrically connected to the first transparent electrode 33 of another liquid crystal optical element 3 (not shown in FIG. 4) on which the connection wire is fixed firmly. On the other hand, the second connection wire 4b is not electrically connected to the first transparent electrode 33 of the other liquid crystal optical element 3 (not shown) on which the connection wire is fixed firmly. In the second non-facing region 32a of the second transparent substrate 32 too, the third connection wire 4c is electrically connected to the second transparent electrode 34 of the liquid crystal optical element 3 shown in FIG. 4. Further, the fourth connection wire 4d is electrically connected to the second transparent electrode 34 of the other liquid crystal optical element 3 (not shown in FIG. 4) on which the connection wire is fixed firmly. By employing this structure, the first transparent electrode 33 and the second transparent electrode 34 of each liquid crystal optical element 3 are connected with each single connection wire 4 so that the light control operation for each liquid crystal optical element 3 can independently be controlled in response to a signal from the driving circuit (not shown).

In order to secure the connection wires onto the insulation layer 41, a known adhesive agent may be used as long as it is not against the spirit of the present invention. Instead of the structure that the insulation layer 41 is used as described above, the first transparent electrode 33 and the second transparent electrode 34 may be subjected to patterning so that desired electrical connections can be obtained. Further, solder, silver paste or the like may be used instead of ACFs 45 to connect the connection wires 4 to the first transparent electrode 33 and so on.

The connection wires 4 are preferably arranged in a substantially linear form as shown in FIG. 2. This arrangement can simplify the manufacturing process and improves the design factor of the light control device. However, they may be arranged to extent on two sides of the first transparent substrate 1 or the like, or may be arranged so that when a connection wire is connected to a plurality of liquid crystal optical elements 3, the connection wire is extended in an X direction on a liquid crystal optical element and is extended in a Y direction on another liquid crystal optical element, depending on designs of a light control device. In any case of the above, firm adhesiveness of the connection wires to the liquid crystal optical elements 3 should be assured.

The shape of a connection wire 4 is preferably flat in its plane to be connected to the first transparent electrode 33 whereby the contact area with respect to the transparent electrode 3 can be widened to thereby reduce the contact resistance. For example, a ribbon-like wire (rectangular wire) may be employed as the connection wire 4. In this case, the cross-sectional shape of the connection wire 4 should be a substantially oval shape or a corner-cutoff rectangular shape as shown in FIG. 4. Such shape can improve the occupied area rate in comparison with a commonly used round wire, so that it can reduce the contact resistance.

The connection wire 4 may be subjected to a matting treatment by being treated with hydrochloric acid. Further, a black or dark coating may be applied to the outer surface of the connection wire 4. With this coating, the incident light is absorbed so that there is small possibility of being recognized from the exterior. Thus, a light control device without impairing the transparency of the first transparent plate 1, the liquid crystal optical element 3 and so on, can be provided. When the light control device is observed from a position of from several meters to several ten meters away, it is possible that the connection wire 4 is not recognized at all. As a result, the light control device 10 can in its entirety be recognized as a uniformly transparent glass sheet. Then, when a voltage is applied to a liquid crystal optical element 3, a display appears as if a picture image burst forth from a void glass sheet. When the connection wire 4 is coated, a conduction material is preferably used so as to increase the contact area. As shown in FIG. 4, the connection wires 4 are covered with a transparent protection layer 43 to thereby prevent effectively the separation of the connection wires 4 fixed firmly on the first transparent substrate 31 or the like. The transparent protection layer 43 is preferably of a high transparency. In selecting the material for the transparent protection layer 43, a material without causing white turbidity or the like by the chemical reaction with the ACF 45 or the transparent solid layer 8, should be selected. When the transparent solid layer 8 does not cause white turbidity by the chemical reaction with the ACF 45, the transparent solid layer 8 may be used for the transparent protection layer 43.

Further, it is preferred for the transparent protection 43 to select a resin material having humidity resistance by which the movement of moisture entering into the liquid crystal optical elements 3 can be prevented. When the transparent protection layer 43 is formed with a material different from the transparent solid layer 8, it is preferred that the refractive index of the transparent protection layer 43 is the same as or closer to the refractive index of the transparent solid layer 8 from the viewpoint of increasing unity.

In the following, a method for producing the light control device 10 of this embodiment will be described. The method to be described hereinbelow is a typical example, and another method for producing the same can be employed as long as it is not contrary to the spirit of the present invention.

Description will be made as to the method for producing a liquid crystal optical element 3. First, on the first transparent substrate 31 and the second transparent substrate 32, the first transparent electrode 33, the second transparent electrode 34, the first alignment film 38, the second alignment film 39, the insulation layers 41 and so on are formed respectively (see FIG. 4). The insulation layers 41 are formed at positions where connection wires 4 are extended on the first transparent electrode 33 in the first non-facing region 31a of the first transparent substrate 31 and connection wire 4 are extended on the second transparent electrode 34 in the second non-facing region 32a of the second transparent substrate 32, provided that at these positions, the connection wires are not electrically connected to the first and second transparent electrodes. The insulation layers 41 may be formed with the same material as the alignment films 38, 39 at the same time of forming them.

Then, the spacers 36 are scattered with an application equipment on the surface of the alignment film of the first transparent substrate 31. A sealing material is applied onto the second transparent substrate 32. After the positioning of the transparent substrate 31 to the second transparent substrate 32 is conducted with use of alignment marks or the like, they are bonded together by application of pressure and heat. The gap between the substrates after the pressing for bonding is kept by means of the spacers 36. Then, a compound liquid as the precursor of the light control layer 35 is injected between the substrates followed by sealing. The sealing method may be a known method.

Thereafter, stimulation is applied from the exterior to the compound liquid of the precursor of the light control layer 35 to thereby form the light control layer 35. As the external stimulation, irradiation of light such as visible rays, ultraviolet rays, electron beams or the like, or heat or the like may be mentioned. Among these, light irradiation is preferably used since the temperature in the polymerization can easily be controlled. As the light irradiation, ultraviolet rays is preferably used because of easiness in handling and manufacturing.

When a photopolymerization phase separation method is used wherein the light control layer 35 is formed by the phase separation of the compound liquid of the precursor of the layer by photopolymerization, a high pressure mercury lamp, a low pressure mercury lamp, a metal halide lamp or the like may be used as the light source.

Conditions of light irradiation in a case that the compound liquid of the precursor of the light control layer 35 is polymerized by light irradiation, depend on kinds of polymerizable monomers. The light intensity of light to be irradiated directly to the compound liquid is preferably from 1 to 400 $mV/cm^2$. If it is less than 1 $mW/cm^2$, the phase separation speed becomes low so that the scattering intensity decreases. If it exceeds 400 $mW/cm^2$, the decomposition reaction takes place due to the light response so that the reduction of retention rate takes place.

The temperature under the light irradiation is preferably in a temperature range wherein the compound liquid exhibits a liquid crystal phase. It is because when the polymerization is conducted at the temperature lower than the compatibility temperature at which the compound liquid exhibits a state of compatibility, phase separation occurs before the photopolymerization whereby these may result a liquid crystal/polymer composite in which the liquid crystal is ununiform state. On the other hand, when the temperature of the compound liquid is too high, the phase transition of the compound liquid is caused from a liquid crystal phase to an isotropic phase whereby the electrooptical characteristics of scattering/transmitting of the liquid crystal optical element may not be obtained. The preferable liquid crystal temperature range in which the compound liquid exhibits a liquid crystal phase is from −10 to 60° C., more preferably from 0 to 50° C. The polymerization is preferably conducted under constant environment by using a constant temperature bath or the like so that the entire surface of the liquid crystal optical element 3 is polymerized under uniform conditions (such as light irradiation, polymerization temperature and so on).

The polymerization initiator can be selected appropriately from known polymerization catalysts. In a case of photopolymerization, a photopolymerization initiator usable generally for photopolymerization such as benzoin ether type, acetophenone type, phosphine oxide type or the like may be used. In a case of heat polymerization, a heat polymerization initiator such as peroxide type, thiol type, amine type, acid anhydride or the like may be used depending on polymerization sites. Further, a curing aid such as amine may be used if the case requires.

The content of the polymerization initiator is generally from 0.1 to 20 parts by weight based on the total amount of 100 parts by weight of the polymerizable monomers, preferably, from 0.1 to 10 parts by weight. When the polymer after the polymerization is required to have a high molecular weight or a high specific resistance, a content of from 0.1 to 5 parts by weight is further preferred. If the content of the polymerization initiator exceeds 20 parts by weight, the compatibility of the compound liquid may be lost.

Further, when the content of the polymerization initiator is less than 0.1 part by weight, a sufficient polymerization of the polymerizable monomers can not be obtained even if the polymerizable monomers contained in the compound liquid are polymerized. Accordingly, a desired phase separation structure can not be formed. Therefore, the above-mentioned range should be satisfied. Further, a known chiral additive may be incorporated into the compound liquid in order to improve the contrast ratio of the liquid crystal optical element at the time of voltage application/non-voltage application. As described above, the liquid crystal optical element is produced.

Figure 5A:
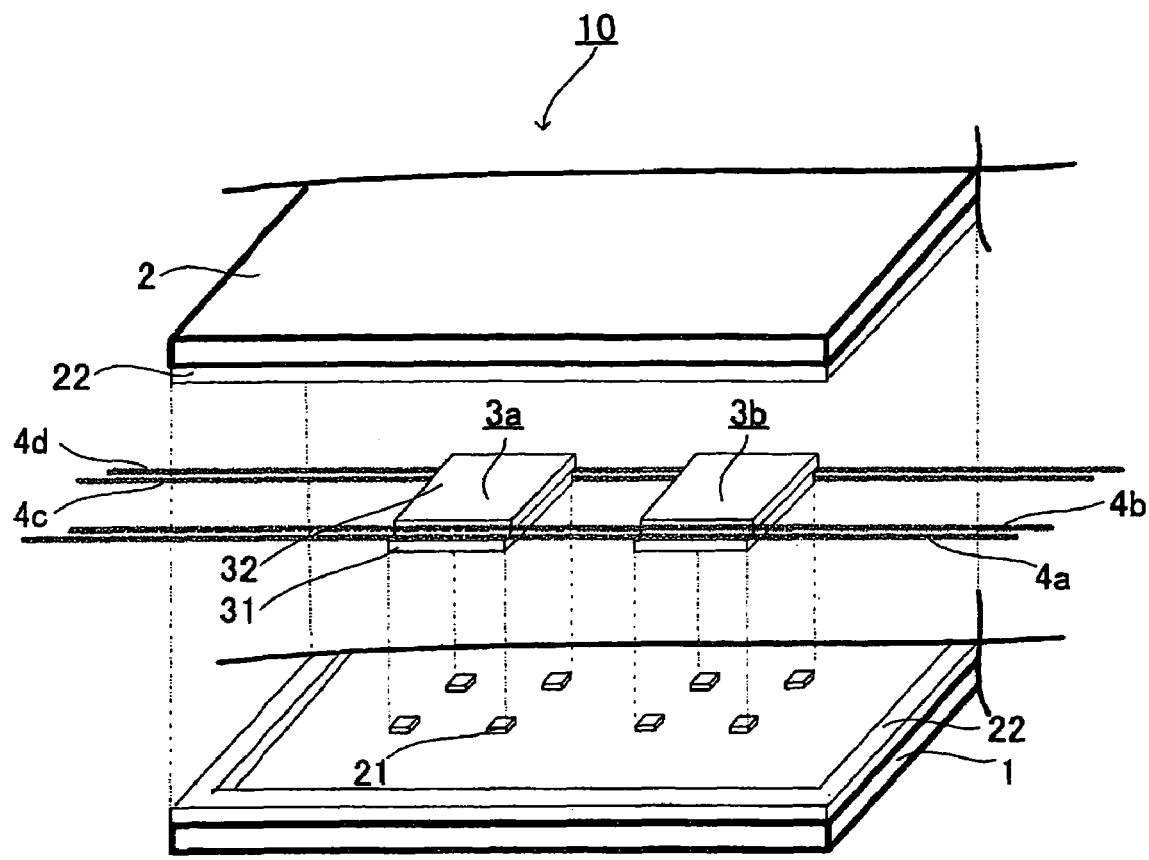
FIG. 5(a) is a partly exploded perspective view of the liquid crystal optical element according to an embodiment of the present invention and FIG. 5(b) is a diagram showing an example of the way of applying a load to a connection wire.
Figure 5B:
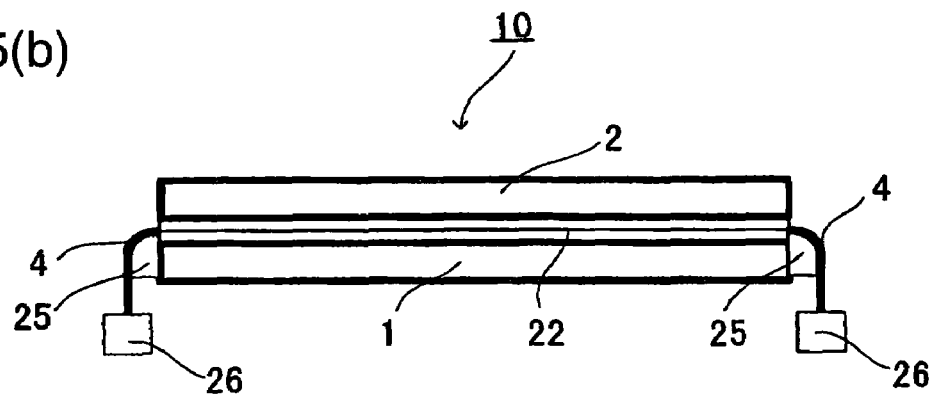

FIG. 5(a) is a partly exploded perspective view of the light control device 10 according to an embodiment of the present invention, and FIG. 5(b) is a diagram showing an example of the method for arranging connection wires 4 in a substantially linear form. For convenience on explanation, the liquid crystal optical element depicted at a left side in the figure in the two liquid crystal optical elements 3 is referred to as a first liquid crystal optical element 3a and that depicted at a right side is referred to as a second liquid crystal optical element 3b. Further, four connection wires depicted in FIG. 5(a) are referred to as a first connection wire 4a, a second connection wire 4b, a third connection wire 4c and a fourth connection wire 4d from the near side with respect to a viewer respectively, in the same manner as in FIG. 4.

On the first non-facing region 31a of the first transparent substrate 31 as a constituent element of each of the first liquid crystal optical element 3a and the second liquid crystal optical element 3b which are produced according to the process described before, the first connection wire 4a and the second connection wire 4b are extended substantially linearly so as to be parallel to each other, these connection wires being fixed thereto. The ACF 45 is used as the fixing means. Thus, electric conduction is obtainable because of surface conduction beads in contact with both conductors. Since the structure that the connection wires are fixed to the portion near a side of the first transparent substrate 31 or the like in its longitudinal direction, is employed, it is possible that the portions of the connection wires to be in contact with the transparent substrate are longer, and accordingly, the connection wires can effectively be adhered to the transparent substrate with a transparent electrode.

In this embodiment, each of the paired transparent electrodes in the liquid crystal optical element 3 is connected electrically with a single connection wire 4. Namely, two connection wires in the four connection wires 4 fixed to each liquid crystal optical element are disposed on the transparent electrodes by interposing the insulation layers 41 so that these two connection wires 4 are not connected electrically to the transparent electrodes.

In the embodiment shown in FIG. 5(*a*), the connection wires 4 are arranged as described below. Namely, when the first connection wire 4*a* and the second connection wire 4*b* are fixed onto the first transparent substrate 31, the first connection wire 4*a* is fixed to the first transparent electrode 33 by means of the ACF 45 (see FIG. 4) so that it is connected electrically to the first transparent electrode 33 of the first liquid crystal optical element 3*a*. Further, this first connection wire 4*a* is fixed onto the insulation layer 41 formed on the first transparent electrode 33 by means of the ACF 45 so that it is not connected electrically to the first transparent electrode 33 of the second liquid crystal optical element 3*b*. The same explanation is applicable also to the second connection wire 4*b*. Namely, the second connection wire 4*b* is fixed onto the first transparent electrode 33 through the ACF 45 so that it is connected electrically to the first transparent electrode 33 of the second liquid crystal optical element 3*b*. Further, this second connection wire 4*b* is fixed onto the insulation layer 41 formed on the second transparent electrode through the ACF 45 so that it is not connected electrically to the first transparent electrode 33 on the first liquid crystal optical element 3*b*. The same explanation is applicable to the third connection wire 4*c* or the fourth connection wire 4*d*.

After the connection of the connection wires 4 to each liquid crystal optical element 3, the transparent protection layer 43 is applied with a dispenser or the like so as to cover the connection wires 4 and the ACFs 45 used for connecting them. It is preferable for the transparent protection layer 43 to use a material having a high transparency and having a refractive index closer to refractive indices of the transparent solid layer 8, the first transparent substrate 31 and the second transparent substrate, as possible. Further, when the transparent solid layer 8 is a liquefied resin material, such a material not to cause white turbidity or the like due to reaction to the liquefied resin material should be selected.

Then, a two-sided tape 22 is bonded to the outer peripheral portions of the first transparent plate 1 and the second transparent plate 2 which have been washed. The width of the two-sided tape 22 is, for example, 10 mm. The thickness of the two-sided tape 22 is adjusted depending on the thickness of the liquid crystal optical element 3, the space distance between the liquid crystal optical element 3 and the first transparent plate 1 and the space distance between the liquid crystal optical element 3 and the second transparent plate 2. The material for the two-sided tape 22 is not in particular limited as far as it can provide excellent adhesiveness to the first transparent plate 1 or the like; it is unlikely to separate from the plate at the time of injecting the liquefied resin material and there is unlikely to cause a chemical reaction to the transparent solid layer 8. It is preferable to coat to side faces of the two-sided tape 22, a material having high wettability with respect to the liquefied resin material, i.e., resin having a small contact angle with respect to the liquefied resin material. Thus, the generation of unwanted air bubbles which may be produced during the injection of the liquefied resin material can effectively be reduced. As the two-sided tape 22, a flexible one is preferably used because a uniform thickness can be obtained at positions where the connection wires 4 traverse the two-sided tape 22.

Then, transparent spacing members 21 are fixed at four corners as the corner portions of each liquid crystal optical element 3. As the fixing means, any known adhesive can be used as long as it is not against the spirit of the present invention. For example, the liquefied resin material constituting the transparent solid layer 8 can be used as the adhesive. The transparent spacing members 21 should have transparency. Further, it is preferred that the refractive index difference between a transparent spacing member 21 and the transparent solid layer 8 is within ±0.10, so that the problem on the recognition of side faces of the transparent spacing members 21 can be improved. Preferably, the refractive index difference between a transparent spacing member 21 and the transparent solid layer 8 is within ±0.01, more preferably, the material of the transparent spacing member is the same as that for the transparent solid layer 8 whereby refractive indices of the transparent solid layer 8 and the transparent spacing member 21 can be made equal.

The transparent spacing member 21 of the same material as the transparent solid layer 8 can be produced as follows, for example. Two glass sheets bonded with films without adhesiveness to the transparent spacing member 21, are prepared. These glass sheets are located so as to face each other with a predetermined space distance. Then, a liquefied resin material is filled in the gap of the two glass sheets opposed. After the curing of the resin material, it is separated and cut into a desired size whereby transparent spacing members 21 can be obtained.

Then, transparent spacing members 21 are bonded to a liquid crystal optical element 3. Positioning of the liquid crystal optical element 3 to the first transparent plate 1 is carried out. A liquefied resin material is applied to contact areas on the first transparent plate 1. The liquid crystal optical element 3 is placed on the first transparent plate 1 at a predetermined position and the liquefied resin material is cured, whereby the liquid crystal optical element 3 can be fixed to the first transparent substrate 1. When liquid crystal optical elements 3 are fixed to the first transparent plate 1, the first liquid crystal optical element 3*a* and the second liquid crystal optical element 3*b* are fixed while a tensile force is applied thereto in directions opposing to each other so that the connection wires 4 extended between the first liquid crystal optical element 3*a* and the second liquid crystal optical element 3*b* do not sag, as shown in FIG. 5. In this case, attention should be paid so as not to cause the problem of elongation in consideration of elongations of the connection wires which can be calculated based on a load to be applied, the thickness of the wires and the Young's modulus.

Instead of the transparent spacing members 21 as the cured product of the liquefied resin material, a two-sided adhesive material having high transparency may be used. Further, the area of adhesion of each transparent spacing member 21 may be increased or the transparent spacing members 21 may be arranged in the entire surface area in the gap between the liquid crystal optical element 3 and the first transparent plate 1, which depends on the degree of adhesiveness to the liquid crystal optical element 3, or depends on whether a sufficient adhesiveness can be obtained with respect to the load applied when the transparent solid layer 8 is cured, which will be described later.

Then, protector papers disposed at four sides of the two-sided tapes 22 bonded to the outer peripheral portions of the first transparent plates 1 or the like are separated, and the positioning of the second transparent plate 2 to the first transparent plate 1 is conducted so that they are correctly opposed, and they are bonded together.

On the other hand, a liquefied resin material for the transparent solid layer 8 is prepared. Two needles are inserted in the two-sided tapes 22 bonded at opposing positions. While vacuuming is conducted at a needle at either side, the liquefied resin material comprising polymerizable monomers as the major component is injected through the needle at the other side. When the inner air layer is discharged, the needle at one side is pulled out. The amount of injection of the liquefied resin material is determined by the calculation of the hardening shrinkage of the liquefied resin material by curing. The injection is carried out so that the first transparent plate 1 and the second transparent plate 2 are kept in parallel. When the inner air layer has been expelled, the needle of the other side is pulled out.

Then, the light control device 10 is kept standing still at normal temperature to cure the liquefied resin material whereby a hardened transparent solid layer 8 can be obtained. In this case, as shown in FIG. 5(*b*), spacers 25 each having a round corner are located at both sides of the transparent plate 1, the connection wires 4 are set to droop along the spacers 25. To both ends of the drooped connection wires 4, weights 26 having equal weight are connected to apply them with the same load in respective vertical directions so that a predetermined tension is applied to these connection wires 4. The loads at the both sides are preferably equal to keep a state of balance. Thus, the connection wires 4 can be straighten without any sag. Instead of the weights 26, springs may be connected to both sides of the connection wires 4 to pull them downward. In selecting the kind of stainless steel for the connection wires 4, the width in wire arrangement and the shape of the wires, it is necessary to select them so that they are durable sufficiently to a load applied during the production process. Thus, the light control device 10 of the above-mentioned embodiment 1 can be produced.

Description has been made as to the structure that the liquefied resin material is injected gradually into a space formed in the gap between two transparent plates to embed at least one optical element, as the example of the above-mentioned embodiment. Besides this, another structure may be employed wherein a resin material of film-like shape is disposed in a space formed in the gap between two transparent plates so that at least one optical element is embedded in the gap between the two transparent plates. Further, the production method as described below may be employed.

First, a seal including spacers is formed in the periphery of either transparent plate. In this case, the seal is formed previously to be higher than the final target value and is rendered to have a predetermined height after the pressure bonding. A plurality of transparent spacing members having a predetermined thickness are disposed on the surface of the transparent plate so as to give a height with respect to the surface of the transparent plate, and an optical element is disposed on a plurality of transparent spacing members. Then, a gap is formed in response to the thickness of the transparent spacing members between the optical element and the transparent plate. The optical element is located at a predetermined position in the surface of the transparent plate. The transparent spacing members are arranged depending on the position. Further, spacers are preferably disposed on the surface at positions where no optical element is disposed.

In a single transparent plate, a plurality of optical elements are disposed on its plane as needed. In the case that the shape of the plane of an optical element is rectangular, it is preferable that a transparent spacing member is provided to each of four corners of the plane. When the shape of the optical element is not rectangular, an appropriate number of transparent spacing members are disposed depending on the shape so that the optical element can keep to be parallel to the transparent plate, and then the optical element is placed on the transparent plate. Further, transparent spacing members are disposed on the upper plane side of the optical element. In this case, it is preferable that these transparent spacing members are located at corresponding positions on upper and lower planes of the optical element. These members can support the both transparent plates in association with the spacers. In this case, the height (thickness) of the peripheral seal should be higher than the height of the optical element. The height of the seal is determined previously in consideration of the liquefied resin material to be dropped afterward.

After disposing the optical element, the liquefied resin material is dropped to the position near the center of the transparent plate. When four optical elements are disposed on a single transparent plate, the dropping may be carried out to around the center among the four optical elements, or the dropping may be carried out to a space between a plurality of optical elements. When a single optical element is disposed on a single transparent plate, the position of dropping may be either the periphery or the upper plane of the optical element. However, it is preferable to select the location so that the liquefied resin material can flow uniformly.

The amount of dropping of the liquefied resin material is determined based on the calculation of the volume of a space between the two transparent plates in the structure to be formed finally. The liquefied resin material is dropped onto the transparent plate on either side or in the vicinity of the periphery of the optical element, as described before, with use of a high-precision dispenser. The transparent plate having been subjected to the dropping is placed in a vacuum chamber, and the other transparent plate is overlaid on the former transparent plate in the vacuum chamber. Finally, the both substrates are adhered together at the peripheral sealing portion. Then, the vacuum state is broken so that the two transparent plates adhered mutually are placed under normal atmospheric pressure. Then, the liquefied resin material moves to the inner vacuum portion due to the pressure difference between the interior and exterior of the two transparent plates bonded together, and the resin material spreads in the entire inner space. Further, the both transparent plates are bonded at positions of height which is defined by the transparent spacing members and/or the spacers whereby the bonded structure unified with the liquefied resin material can be formed.

In the process described above, the way of arranging at least one optical element and the seal in either transparent plate varies depending on the size and the thickness of the bonded structure in its entirety, the size and the thickness of the optical element and so on. However, any combination of a way of arranging previously the optical element in either one of front and rear transparent plates and a way of arranging previously the seal in either one of the transparent plates, is basically optional. Further, in this method, it is preferable to use a liquefied resin material comprising a nonvolatile compound as the major component such as acryl oligomer because a vacuum process is employed.

MODIFIED EMBODIMENT 1

Figure 6:
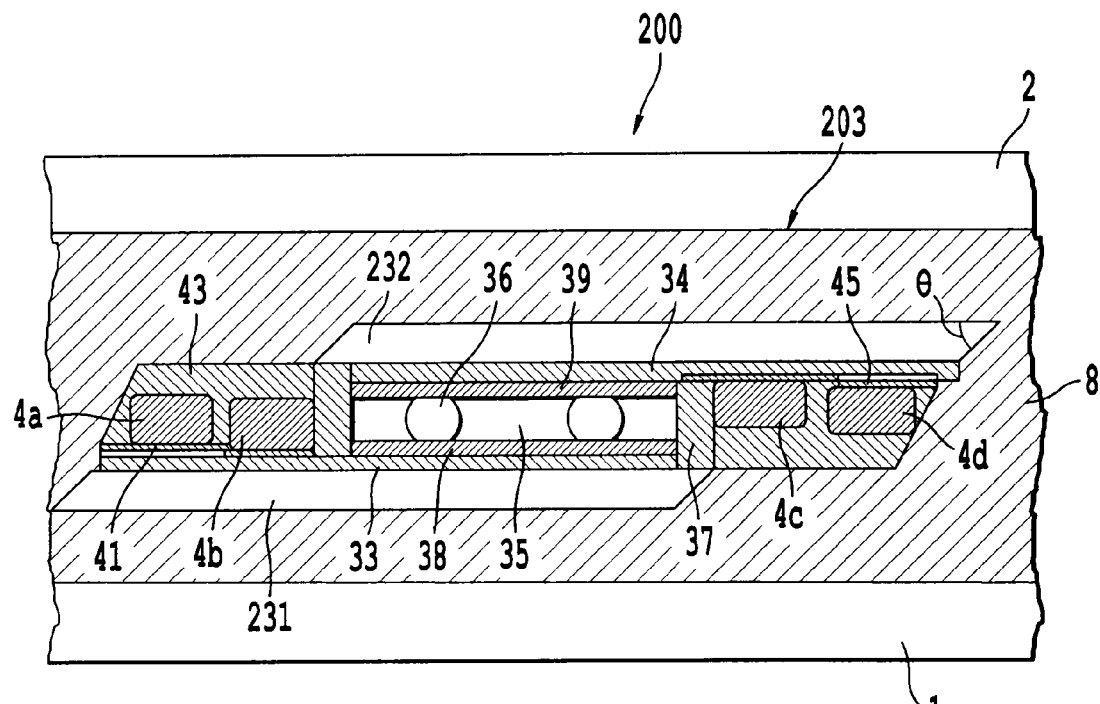
FIG. 6 is a partly exploded perspective view of the liquid crystal optical element according to another embodiment of the present invention.
Figure 7:
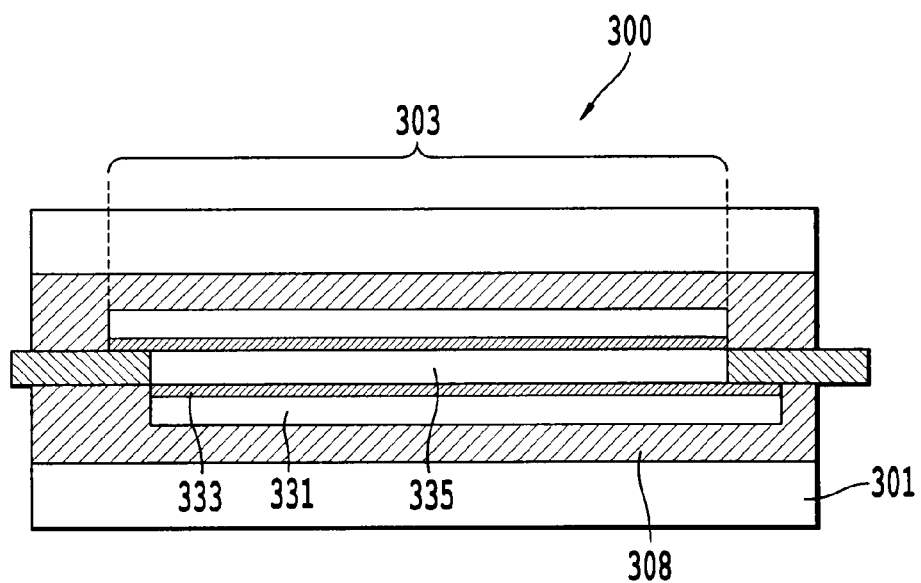
FIG. 7 is a diagrammatically cross-sectional view showing the structure of the light control device according to a conventional technique.

In the following, description will be made as to a liquid crystal optical element different from the liquid crystal optical element 3 installed in the light control device 10 as described with reference to the above-mentioned embodiments. FIG. 6 is a diagrammatical cross-sectional view showing an embodiment of the structure of a light control device 200 according to modified embodiment 1 wherein the same elements as the above-mentioned embodiment are indicated with the same reference numerals, and therefore, description of these elements is omitted.

The light control device of this Modified Embodiment 1 is the same in its basic structure as the above-mentioned embodiment. However, the following point is different. Namely, in the light control device 10 according to the above-mentioned embodiment, the side face of the first transparent substrate 31 or the second transparent substrate 32 constituting the liquid crystal optical element 3 is orthogonal with respect to the major plane of the transparent substrate. On the other hand, in the light control device 200 according to this Modified Embodiment 1, the side face of a first transparent substrate 231 or a second transparent substrate 232 constituting a liquid crystal optical element 203 has a tapered shape.

Figure 1A:
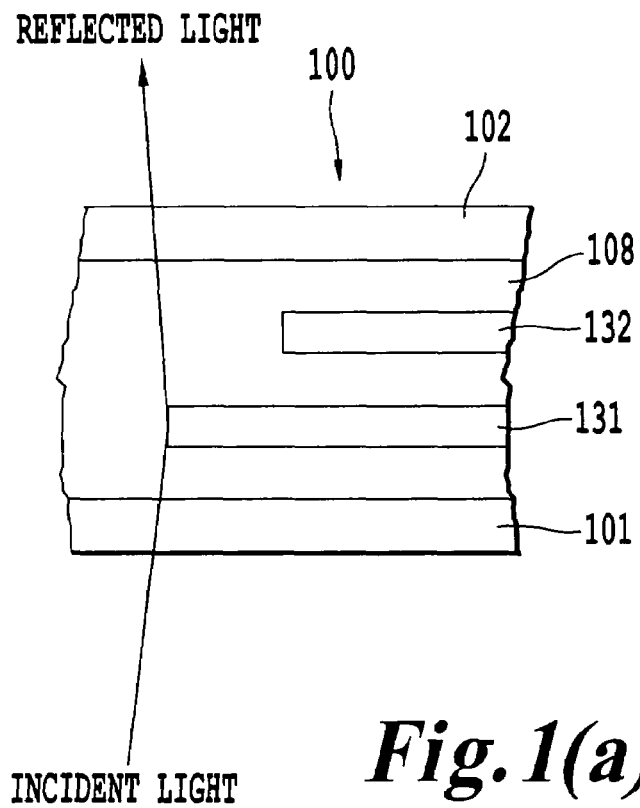
Figure 1B:
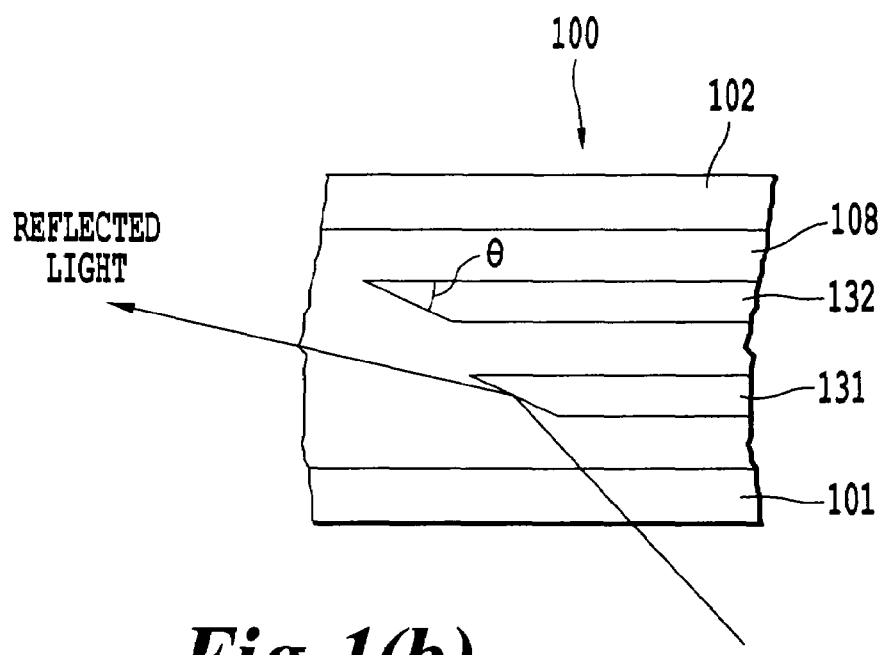

Generally, the light control device is observed by a viewer from a direction of substantially normal line with respect to the major planes of the two transparent plates. Accordingly, it is ideal that the reflected light does not reach the viewer within this range of direction. As explained with reference to FIGS. 1(a) and 1(b), since the side face of the first transparent substrate 231 or the second transparent substrate 232 is formed to have a tapered shape, the visibility to the side face of the first transparent substrate 231 or the second transparent substrate 232 can be improved in comparison with the case that the side face is orthogonal with respect to the major planes. As a result, the light control device ensuring high unity of the first transparent substrate 231, the second transparent substrate 232 and the transparent solid layer 8 held in the gap between the first transparent plate 1 and the second transparent plate 2, can be provided.

and the second transparent substrate 232 are respectively the same. However, it is possible to produce the light control devices having the structure that the transparent plates having different refractive indices are used to satisfy the relations of the formula 1 and formula 2.

EXAMPLE

Now, the present invention will be described in further detail with reference to Examples. However, it should be understood that the present invention is by no means restricted to such specific Examples.

By using light control devices produced according to the method described on the above-mentioned embodiments, the presence or absence of light reflection at the side face of each first transparent substrate was examined. Specifically, sensory evaluation method was conducted under the condition that the major plane of the light control devices was put on a blue colored material in a room irradiated with a fluorescent lamp and the devices were observed from a position 30 cm apart from each first transparent plate along the direction of normal line. Table 1 shows a result. The angle shown in Table 1 in each case that the side face of the first transparent substrate has a tapered shape indicates an angle of inclination of the taper at the edge portion of each of the first transparent plate. Further, the refractive indices are measured with NAR-4T manufactured by ATAGO Co.

TABLE 1

| | Refractive index of 1st transparent substrate | Refractive index of transparent solid layer | Refractive index difference | Shape of side face of 1st transparent substrate | Presence or absence of light reflection at sideface of 1st transparent substrate |
|---|---|---|---|---|---|
| Example 1 | 1.471 | 1.486 | 0.015 | Taper (30°) | No |
| Example 2 | 1.516 | 1.486 | 0.03 | Taper (30°) | No |
| Example 3 | 1.493 | 1.486 | 0.007 | Taper (30°) | No |
| Comparative Example 1 | 1.471 | 1.486 | 0.015 | Orthogonal | Yes |
| Comparative Example 2 | 1.516 | 1.486 | 0.03 | Orthogonal | Yes |
| Comparative Example 3 | 1.516 | 1.486 | 0.06 | R shape | Yes |
| Comparative Example 4 | 1.493 | 1.486 | 0.007 | Orthogonal | Yes |

It is more preferable that in the case that tapers are formed in the first transparent substrate 231 and the second transparent substrate 232 and that when the refractive index of any one of the first transparent plate 1 and the second transparent plate 2 is represented by $n_a$, the refractive index of the transparent solid layer 8 is represented by $n_b$, the refractive index of any one of the first transparent substrate 231 and the second transparent substrate 232 is represented by $n_c$ and the taper angle of the transparent substrate 231 or the transparent substrate 232 is represented by θ (degree), there is a relation of $n_a > n_b$, and when $n_b > n_c$, the following formula 1 is satisfied, and when $n_b < n_c$, the following formula 2 is satisfied:

$$\theta < 180 - \sin^{-1}(1/n_b) - \sin^{-1}(n_c/n_b) \quad \text{Formula 1}$$

$$\theta < \sin^{-1}(n_b/n_c) - \sin^{-1}(1/n_c) \quad \text{Formula 2}$$

When the above formula 1 and formula 2 are satisfied, the visibility to the side faces of the transparent substrates can more effectively be improved. In the above, explanation has been made as to the embodiments wherein refractive indices of the first transparent plate 1 and the second transparent plate 2, and refractive indices of the first transparent substrate 231

In the example that the refractive index of the first transparent substrate was 1.516, soda lime type glass was used, and in the examples that the refractive indices were 1.493 and 1.471, borosilicate type glass were used. With respect to the refractive index of glass, see, for example, Chapter 5, THE NATURE OF GLASS, 6, nature of glass in Dictionary of Glass (published by Asakura Shoten, 1st edition, 1985 edited by Sumio Sakka).

Table 1 shows the results that light reflection at the side faces of the first transparent substrates is not observed by forming a tapered shape in the side faces of the first transparent substrates of the liquid crystal optical elements. On the other hand, in the examples that the first transparent substrates were formed to have is an orthogonal shape or a round shape, light reflection was observed at the side faces of the first transparent substrates. The visibility to the side faces of the first transparent substrates could be improved by forming the side faces of the first transparent substrates to have a tapered shape. In the above-mentioned embodiments, explanation is made as to the transmittance/scattering type liquid crystal optical element 3 comprising a liquid crystal/polymer composite as an example of the optical element. However, the optical element is not limited thereto, and the following type of optical element may be used. Namely, there is a transmittance-variable type liquid crystal optical element comprising a combination of liquid crystal and a polarization film, a transmittance-variable type liquid crystal optical element comprising liquid crystal added with a dichroic colorant, an electrochromic optical element using an electrochromic material, an electrophoretic optical element utilizing electrophoresis phenomenon or the like. Further, as the optical element, a dot matrix type or segment type optical element may be used.

The light control device of the present invention may be used as an architectural interior/exterior material such as a window, a roof light window, a partition, a door or the like, a sign, a medium for advertisement and so on. Further, it can be used for a special window material such as a window or a sunroof of an automobile or a large-sized partition. In particular, it is suitable for a large-sized display device for public since it is possible to provide information to users by displaying information in combination of figures and patterns or displaying characters. As examples of information, there are weather forecast, time display, guidance information for buildings, advance notice, danger sign and so on.

Since the light control device of the present invention is adapted so that characters or figures emerge to the surface of a transparent material such as glass at predetermined timing, it can draw a user's attention or attract a user's notice. Accordingly, it may be used for a display of advertisement using a company logo, a tradename or the like which depends on a pattern formed in the light control region 6, or may be used as a message board for drawing viewer's attention to catchphrases, warnings and so on or a display for alarming. If needed, the first transparent plate 1 or the like may be applied with decoration such as characters. For instance, characters are printed on the first transparent plate 1 at a position corresponding to the light control region 6 and the light transmission state of the light control region 6 may be controlled according to a music. With such measures, the user's attention can be paid to the light control region 6 to increase further effect of advertisement or the like.

In the embodiment shown in FIG. 2, the optical elements are arranged to have a 4 panel structure comprising two columns and two rows. According to the present invention, the number of panels can be increased to have an arrangement of 6×6 optical elements, 8×8 optical elements or more number of optical elements. In this case, characters or figures can be displayed as a whole by turning-on/off respective panels independently. For example, a company name can be displayed as if it moves continuously in a vertical or lateral direction, for the purpose of advertisement or propaganda. Thus, a display of "character-streaming" type can be realized by the light control device of the present invention. Further, the display of "character-streaming" type may be moved to an optional location in the panel surface or this display may be switched with specified intervals. Any light control device has good design factor as a transparent display and provides excellent visibility.

In the light control device of the present invention, when it is so designed that the connection wires 4 so designed as not to be recognized at a position several meters apart from a viewer, according to the above-mentioned method, the light control device can be seen as if it is comprised of a single glass sheet when the light control region 3*a* is in a light transmitting state. Accordingly, the light control device of the present invention can be used as a glass sheet having a high design factor for a shop.

Further, the light control device of the present invention can be used simply for controlling the light transmittance of the entire light control plane. According to the present invention, the light control device having a large surface area, high transparency and a display of high appearance quality can easily be produced. Further, a color filter, an infrared protection filter or a ultraviolet protection filter may be laminated on the light control device of the present invention, or a mirror is laminated on the back face of it. In addition, various applications are possible as long as the effect of the present invention is not impaired.

In the light control device of the present invention, irrespective of the number of optical elements installed therein, the unity of transparent members to be held in the gap between two transparent plates can be increased.

The entire disclosure of Japanese Patent Application No. 2005-187454 filed on Jun. 27, 2005 including specification, claims, drawings and summary is incorporated herein by reference in its entirety.

What is claimed is:

1. A light control device comprising a plurality of optical elements disposed between two transparent plates, said optical elements each comprising a pair of transparent substrates with transparent electrodes facing each other and a light control layer, disposed between the pair of transparent electrodes, capable of changing the light transmitting state by electrically controlling the pair of transparent electrodes, wherein a transparent solid layer is disposed in a space formed in the gap between the two transparent plates, the transparent substrates have taper-shaped side faces, the optical element is a transmitting and scattering type liquid crystal optical element, and when the refractive index of any of the transparent plates is represented by $n_a$, the refractive index of the transparent solid layer is represented by $n_b$, the refractive index of any of the transparent substrates is represented by $n_c$ and the taper angle of any of the transparent substrates is represented by $\theta$ (degree), there is a relation of $n_a > n_b$, and when $n_b > n_c$, the following Formula 1 is satisfied, and when $n_b < n_c$, the following Formula 2 is satisfied:

$$\theta < 180 - \sin^{-1}(1/n_b) - \sin^{-1}(n_c/n_b) \qquad \text{Formula 1}$$

$$\theta < \sin^{-1}(n_b/n_c) - \sin^{-1}(1/n_c) \qquad \text{Formula 2.}$$

2. A light control device comprising at least one optical element disposed between two transparent plates, said optical element comprising a pair of transparent substrates with transparent electrodes facing each other and a light control layer, disposed between the pair of transparent electrodes, capable of changing the light transmitting state by electrically controlling the pair of transparent electrodes, wherein a transparent solid layer is disposed in a space formed in the gap between the two transparent plates, the refractive index difference between the transparent solid layer and a transparent substrate is within ±0.10, the optical element is a transmitting and scattering type liquid crystal optical element, and the device can transmit light when no voltage is applied and scatter light when voltage is applied.

3. A light control device comprising a plurality of optical elements disposed between two transparent plates, said optical elements each comprising a pair of transparent substrates with transparent electrodes facing each other and a light control layer, disposed between the pair of transparent electrodes, capable of changing the light transmitting state by electrically controlling the pair of transparent electrodes, wherein a transparent solid layer is disposed in a space formed in the gap between the two transparent plates, the transparent substrates have taper-shaped side faces, the optical element is a transmitting and scattering type liquid crystal optical element, and the device can transmit light when no voltage is applied and scatter light when voltage is applied.

4. A light control device comprising at least one optical element disposed between two transparent plates, said optical element comprising a pair of transparent substrates with transparent electrodes facing each other and a light control layer, disposed between the pair of transparent electrodes, capable of changing the light transmitting state by electrically controlling the transparent electrodes, wherein the optical element is located so as to face the two transparent plates with distances, transparent spacing members are formed between the optical element and the two transparent plates, a transparent solid layer is disposed in a space formed in the gap between the two transparent plates, the refractive index difference between the transparent solid layer and any of the transparent substrates is within ±0.10, the optical element is a transmitting and scattering type liquid crystal optical element, and the device can transmit light when no voltage is applied and scatter light when voltage is applied.

5. A light control device comprising at least one optical element disposed between two transparent plates, said optical element comprising a pair of transparent substrates with transparent electrodes facing each other and a light control layer, disposed between the pair of transparent electrodes, capable of changing the light transmitting state by electrically controlling the pair of transparent electrodes, wherein a transparent solid layer is disposed in a space formed in the gap between the two transparent plates, the refractive index difference between the transparent solid layer and a transparent substrate is within ±0.10, the optical element is a transmitting and scattering type liquid crystal optical element and a first transparent substrate and a second transparent substrate each has a non-facing region in the vicinity of its one side, which does not face the other transparent substrate, and each non-facing region has wires connected to the substrate.

6. A light control device comprising a plurality of optical elements disposed between two transparent plates, said optical elements each comprising a pair of transparent substrates with transparent electrodes facing each other and a light control layer, disposed between the pair of transparent electrodes, capable of changing the light transmitting state by electrically controlling the pair of transparent electrodes, wherein a transparent solid layer is disposed in a space formed in the gap between the two transparent plates, the transparent substrates have taper-shaped side faces, the optical element is a transmitting and scattering type liquid crystal optical element, and a first transparent substrate and a second transparent substrate each has a non-facing region in the vicinity of its one side, which does not face the other transparent substrate, and each non-facing region has wires connected to the substrate.

7. A light control device comprising at least one optical element disposed between two transparent plates, said optical element comprising a pair of transparent substrates with transparent electrodes facing each other and a light control layer, disposed between the pair of transparent electrodes, capable of changing the light transmitting state by electrically controlling the transparent electrodes, wherein the optical element is located so as to face the two transparent plates with distances, transparent spacing members are formed between the optical element and the two transparent plates, a transparent solid layer is disposed in a space formed in the gap between the two transparent plates, the refractive index difference between the transparent solid layer and any of the transparent substrates is within ±0.10, the optical element is a transmitting and scattering type liquid crystal optical element, and a first transparent substrate and a second transparent substrate each has a non-facing region in the vicinity of its one side, which does not face the other transparent substrate, and each non-facing region has wires connected to the substrate.

8. A method for producing a light control device having an optical element between two transparent plates, comprising:

preparing an optical element in which a pair of transparent substrates with transparent electrodes are facing each other and a light control layer capable of changing the light transmitting state by electrically controlling the pair of transparent electrodes is disposed between the pair of transparent electrodes, fixing the optical element to at least one of the two transparent plates and disposing a transparent solid layer in a space formed in the gap between the two transparent plates, wherein the refractive index difference between the transparent solid layer and any of the transparent substrates is within ±0.10, the light control device transmits and scatters light, and the preparing of the optical element comprises placing a first transparent substrate and a second transparent substrate so that each has a non-facing region in the vicinity of its one side, which does not face the other transparent substrate, and connecting wires to each non-facing region of the substrates.

9. A method for producing a light control device having an optical element between two transparent plates, comprising:

disposing a pair of transparent substrates having taper-shaped side faces at front and rear sides of an optical element, forming a transparent electrode on each of the pair of the transparent substrates, preparing the optical element so that a light control layer capable of changing the light transmitting state by electrically controlling the pair of transparent electrodes is disposed between the pair of transparent electrodes, fixing the optical element to at least one of the two transparent plates, and disposing a transparent solid layer in a space formed in the gap between the two transparent plates, wherein the light control device transmits and scatters light, and the preparing of the optical element comprises placing a first transparent substrate and a second transparent substrate so that each has a non-facing region in the vicinity of its one side, which does not face the other transparent substrate, and connecting wires to each non-facing region of the substrates.

10. A method for producing a light control device having an optical element between two transparent plates, which comprises:

preparing an optical element in which a pair of transparent substrates with transparent electrodes are facing each other and a light control layer capable of changing the light transmitting state by electrically controlling the pair of transparent electrodes is disposed between the pair of transparent electrodes, fixing the optical element to at least one of the two transparent plates and disposing a transparent solid layer in a space formed in the gap between the two transparent plates wherein the refractive index difference between the transparent solid layer and any of the transparent substrates is within ±0.10, wherein the light control device transmits light when no voltage is applied and scatters light when voltage is applied.

11. A method for producing a light control device having an optical element between two transparent plates, which composes;

disposing a pair of transparent substrate having taper-shaped side faces at front and rear sides of an optical element, forming a transparent electrode on each of the pair of the transparent substrates, preparing the optical element so that a light control layer capable of changing the light transmitting state by electrically controlling the pair of transparent electrodes is disposed between the pair of transparent electrodes, fixing the optical element to at least one of the two transparent plates and disposing a transparent solid layer in a space formed in the gap between the two transparent plates, wherein the light control device transmits light when no voltage is applied and scatters light when voltage is applied.

* * * * *